US011568331B2

(12) United States Patent
Volchegursky et al.

(10) Patent No.: US 11,568,331 B2
(45) Date of Patent: Jan. 31, 2023

(54) METHODS AND SYSTEMS FOR PROVIDING AUTOMATED PREDICTIVE ANALYSIS

(71) Applicant: Open Text Corporation, Waterloo (CA)

(72) Inventors: Dmitry Volchegursky, Livermore, CA (US); Aviv Rosenfeld, Tel-Aviv (IL); Nathaniel Davidson, Raanana (IL)

(73) Assignee: OPEN TEXT CORPORATION, Waterloo (CA)

( * ) Notice: Subject to any disclaimer, the term of this patent is extended or adjusted under 35 U.S.C. 154(b) by 19 days.

(21) Appl. No.: 16/808,103

(22) Filed: Mar. 3, 2020

(65) Prior Publication Data
US 2020/0202264 A1    Jun. 25, 2020

Related U.S. Application Data

(63) Continuation of application No. 13/245,338, filed on Sep. 26, 2011, now abandoned.

(51) Int. Cl.
G06Q 10/04    (2012.01)
G06Q 10/06    (2012.01)
(Continued)

(52) U.S. Cl.
CPC .............. *G06Q 10/04* (2013.01); *G06N 5/04* (2013.01); *G06N 20/00* (2019.01); *G06Q 10/063* (2013.01); *G06Q 10/067* (2013.01)

(58) Field of Classification Search
None
See application file for complete search history.

(56) References Cited

U.S. PATENT DOCUMENTS 5,812,988 A    9/1998  Sandretto
5,884,287 A    3/1999  Edesess
(Continued)

FOREIGN PATENT DOCUMENTS

EP    1717735 A2 *  11/2006  ............. G06K 9/623

OTHER PUBLICATIONS

Stein RM, The relationship between default prediction and lending profits, Integrating ROC analysis and loan pricing, Journal of Banking and Finance, 29-5, 1213-36, May 2005 https://www.sciencedirect.com/science/article/pii/S0378426604000895 (Year: 2005).*

(Continued)

Primary Examiner — Octavian Rotaru
(74) Attorney, Agent, or Firm — Sprinkle IP Law Group

(57) ABSTRACT

A method for providing automated predictive analysis for a case management system is disclosed and includes providing, by a server, a case management system comprising configuration information defining a plurality of case attributes and performance criteria comprising at least one performance criterion, and comprising case management data associated with the plurality of case attributes and a plurality of cases, and automatically determining a projected outcome associated with a performance criterion included in the configuration information. The method also includes identifying a correlation between a case attribute and the projected outcome based on case management data associated with the case attribute and/or case management data associated with the performance criterion, generating a prediction model based on the correlation and providing a prediction relating to the projected outcome based on the correlation.

20 Claims, 4 Drawing Sheets

(51) Int. Cl.
*G06N 5/04* (2006.01)
*G06N 20/00* (2019.01)

(56) References Cited

U.S. PATENT DOCUMENTS

| | | | |
|---|---|---|---|
| 5,930,762 A | 6/1999 | Masch | |
| 6,088,676 A | 6/2000 | White | |
| 6,289,321 B1 | 9/2001 | Suganuma | |
| 6,415,276 B1 | 7/2002 | Heger | |
| 6,456,622 B1 | 9/2002 | Skaanning | |
| 6,553,114 B1 | 4/2003 | Fisher | |
| 6,760,722 B1* | 7/2004 | Raghunandan | G06N 5/046 |
| 6,973,459 B1 | 12/2005 | Yarmus | |
| 7,079,993 B2 | 7/2006 | Stephenson | |
| 7,313,531 B2 | 12/2007 | Chappel | |
| 7,483,842 B1 | 1/2009 | Fung | |
| 7,509,277 B1 | 3/2009 | Gatto | |
| 7,603,326 B2* | 10/2009 | Bonabeau | G06N 3/126 706/13 |
| 7,765,123 B2 | 7/2010 | Shan | |
| 7,774,743 B1 | 8/2010 | Sanchez | |
| 8,005,706 B1 | 8/2011 | Cassone | |
| 8,341,063 B1 | 12/2012 | Cernyar | |
| 8,996,141 B1 | 3/2015 | Alsaleem | |
| 9,317,819 B2 | 4/2016 | Ban | |
| 9,507,851 B1* | 11/2016 | Marquie | G06F 16/9535 |
| 2002/0022952 A1* | 2/2002 | Zager | H04L 41/0233 703/22 |
| 2002/0188536 A1 | 12/2002 | Milosavjevic | |
| 2002/0194102 A1 | 12/2002 | Suganuma | |
| 2004/0030667 A1 | 2/2004 | Xu | |
| 2004/0111509 A1 | 6/2004 | Eilam | |
| 2004/0129199 A1 | 7/2004 | Hamrick | |
| 2004/0153373 A1 | 8/2004 | Song | |
| 2005/0021485 A1 | 1/2005 | Nodelman | |
| 2006/0149608 A1* | 7/2006 | Asgari | G05B 13/0265 703/2 |
| 2006/0155596 A1 | 7/2006 | Thier | |
| 2006/0212412 A1* | 9/2006 | Sapir | G06N 20/00 706/12 |
| 2006/0271210 A1* | 11/2006 | Subbu | G06K 9/623 700/44 |
| 2007/0005547 A1* | 1/2007 | Nochta | G06N 5/00 706/47 |
| 2007/0043611 A1 | 2/2007 | Newman | |
| 2007/0124186 A1 | 5/2007 | Virine | |
| 2007/0150298 A1 | 6/2007 | Barney | |
| 2007/0236708 A1* | 10/2007 | Jahn | G06Q 10/06 358/1.6 |
| 2007/0250461 A1 | 10/2007 | Sabe | |
| 2008/0120148 A1* | 5/2008 | Narayanan | G06Q 10/04 705/7.11 |
| 2008/0189237 A1* | 8/2008 | Crivat | G06N 7/00 703/2 |
| 2008/0249957 A1 | 10/2008 | Masuyama | |
| 2008/0295096 A1 | 11/2008 | Beaty | |
| 2009/0063378 A1 | 3/2009 | Izikson | |
| 2009/0171879 A1 | 7/2009 | Bullen | |
| 2010/0042623 A1 | 2/2010 | Feng | |
| 2010/0082382 A1 | 4/2010 | Kisin | |
| 2010/0082405 A1 | 4/2010 | Shan | |
| 2010/0094781 A1 | 4/2010 | Barney | |
| 2010/0100418 A1* | 4/2010 | Richter | G06Q 30/0203 705/14.55 |
| 2010/0100521 A1* | 4/2010 | Fujimaki | G05B 23/0297 706/47 |
| 2010/0131453 A1* | 5/2010 | Firminger | G06N 5/04 706/54 |
| 2010/0178978 A1 | 7/2010 | Fairfax | |
| 2010/0317420 A1 | 12/2010 | Hoffberg | |
| 2011/0071869 A1 | 3/2011 | O'Brien | |
| 2011/0184884 A1 | 7/2011 | Lyons | |
| 2011/0247363 A1 | 10/2011 | Dalstra | |
| 2012/0066547 A1* | 3/2012 | Gilbert | H04L 41/5074 714/26 |
| 2012/0078825 A1* | 3/2012 | Kulkarni | G06F 16/24578 706/12 |
| 2013/0024408 A1* | 1/2013 | Firminger | G06Q 10/06 706/17 |
| 2013/0036447 A1 | 2/2013 | Lassesen | |
| 2013/0182700 A1* | 7/2013 | Figura | H04L 43/04 370/352 |
| 2015/0047947 A1 | 2/2015 | Tait | |

OTHER PUBLICATIONS

Huang et al, Comparing Naive Bayes, Decision Trees and SVM with AUC and Accuracy, IEEE International Conference on data mining, 2003 https://ieeexplore.ieee.org/abstract/document/1250975 (Year: 2003).*

Office Action for U.S. Appl. No. 13/245,338, dated Dec. 3, 2012, 35 pgs.

Breese, John S., et al, Empirical Analysis of Predictive Algorithms for Collaborative Filtering, ISBN 155860555X, UAI 98 Proceeding on the 14th Conf. on Uncertainty in Artificial Intelligence, 1998, pp. 43-52.

EMC Documentum, xCelerated Composition Platform, Performance Tuning Guide, Version 1.6, EMC Corporation, Hopkinton, MA, 2011, 109 pgs.

Geweke, John, Contemporary Bayesian Econometrics and Statistics, Wiley, ISBN 047169321, 2005, 308 pgs.

Hong, Jong-Yi, et al., Context Aware Systems—A literature review and classification, 0957-4174, Elsevier, 2008, pp. 8509-8522, retrieved from <<http://bluecoat-01/?cfru=aHR0DovL2NpdGVzZWVyeC5p c3QucHN1LmVkdS92aVW3ZG9jL2Rvd25sb2FkP2RvaT0xMC4x LjEuMTY0LjM4OTcmcmVwPXJlcDEmdHlwZT1wZGY=>>.

Huang, Jin, et al., Comparing Naïve Bayes, Decision Trees, and SVM with AUC and Accuracy, IEEE International Conf. on Data Mining, 2003, 4 pgs.

Joachims, Thorsten, A Probabilistic Analysis of the Rocchio Algorithm with TFIDF for Text Categorization, School of Computer Science, Carnegie Mellon University, Pittsburgh, PA, Mar. 1996, 26 pgs.

Moore, Andreww., et al., Internet Traffic Classification Using Bayesian Analysis Techniques, ACM 1-59593-022-1/05/0006, SIGMETRICS, Jun. 6-10, 2005, pp. 50-60.

Office Action for U.S. Appl. No. 13/245,338, dated Apr. 22, 2013, 39 pgs.

Office Action for U.S. Appl. No. 13/245,338, dated Oct. 17, 2014, 57 pgs.

Office Action for U.S. Appl. No. 13/245,338, dated Feb. 4, 2015, 59 pgs.

Office Action for U.S. Appl. No. 13/245,338, dated May 21, 2015, 38 pgs.

Coefficient of determination, Wikipedia, the free encyclopedia, archives.org, Feb. 10, 2010, 6 pgs., retrieved from <<https://web.archive.org/web/20100210145046/http://en.wikipedia.org/wiki/Coefficient_of_determination.

Office Action for U.S. Appl. No. 13/245,338, dated Dec. 3, 2015, 56 pgs.

Office Action for U.S. Appl. No. 13/245,338, dated Jan. 5, 2017, 48 pgs.

Moving average—Wikipedia, the free encyclopedia, archives.org., retrieved from https://web.archive.org/web/20100212232016/http://en.wikipedia.org/wiki/Moving_average, Feb. 2010, 5 pgs.

Office Action for U.S. Appl. No. 13/245,338, dated Jan. 11, 2018, 30 pgs.

Office Action for U.S. Appl. No. 13/245,338, dated Jun. 4, 2018, 41 pgs.

Definition of Correlation, Oxford Dictionary, undated, retrieved from https://en.oxforddictionaries.com/definition/correlation, 2 pgs.

Office Action for U.S. Appl. No. 13/245,338, dated Dec. 18, 2018, 42 pgs.

Office Action for U.S. Appl. No. 13/245,338, dated Jun. 21, 2019, 39 pgs.

(56) References Cited

OTHER PUBLICATIONS

Office Action for U.S. Appl. No. 13/245,338, dated Dec. 2, 2019, 43 pgs.

* cited by examiner

METHODS AND SYSTEMS FOR PROVIDING AUTOMATED PREDICTIVE ANALYSIS

CROSS-REFERENCE TO RELATED PATENT APPLICATIONS

This application is a continuation of, and claims a benefit of priority under 35 U.S.C. 120 from, U.S. patent application Ser. No. 13/245,338 filed Sep. 26, 2011, entitled "METHODS AND SYSTEMS FOR PROVIDING AUTOMATED PREDICTIVE ANALYSIS," which is hereby fully incorporated herein by reference for all purposes.

BACKGROUND

Predictive analytics is an area of statistical analysis that deals with extracting information from data and using it to predict future trends and behavior patterns open. The core of predictive analytics relies on capturing relationships between explanatory variables and the predicted variables from past occurrences. These relationships are typically embodied in a predictive model that can be used to make predictions about future events. For example, in business, predictive models can expose patterns found in historical and transactional data to identify risks and opportunities.

Alternatively, a predictive model can quantify relationships in data in a way that is often used to classify customers into groups, e.g., by product preferences or life stage. Alternatively, a predictive model can describe relationships between all elements of a decision, e.g., the known data (including results of predictive models), the decision and the forecast results of the decision, in order to predict the results of decisions involving many variables.

Predictive models can provide clear benefits and advantages. Nevertheless, the process of developing a predictive model is costly in time, energy and money. For example, predictive analysis generally requires highly educated and trained, and therefore, highly paid, experts in statistical analysis to develop the predictive models. In addition, the process requires a significant amount of raw data, which must be prepared, e.g., cleaned and suitably structured, and/or preprocessed before it can be analyzed. Moreover, because the experts typically test and retest candidate models before settling on a final model, the process can take weeks or months to complete.

For many enterprises, the cost of predictive analysis precludes the enterprise from enjoying the potential benefits and advantages.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

The subject matter presented herein provides for automated predictive analysis for a case management system. According to an embodiment, a case management system is provided that allows an enterprise to manage its business operations and/or sales. For example, the case management system can support applications that allow the enterprise to collect and store case management data associated with a plurality of cases, e.g., product sales, insurance claims, patient records and the like. For example, the case management data for a case can include case attributes associated with a customer's address and occupation, a product purchase date, a product return date, and a complaint description.

In an embodiment, a predicative analysis engine is provided and configured to work cooperatively with the case management system to provide automated and on-demand predicative analysis capabilities. The predictive analysis engine can, in an embodiment, automatically extract the case management data from the case management system and can be configured to automatically analyze the data to determine correlations between case attributes and identified outcomes, which can be automatically derived from the enterprise's business goals and/or performance criteria. The predictive analysis engine can use the determined correlations to generate a prediction model, which can then be used to provide predictions relating to case attributes and potential adverse or beneficial outcomes.

In an embodiment, the predictive analysis engine can continuously update or modify the predictive model as the case management system receives incoming case management data for new or existing cases. It can also be configured to provide predictions periodically or upon request.

Figure 1:
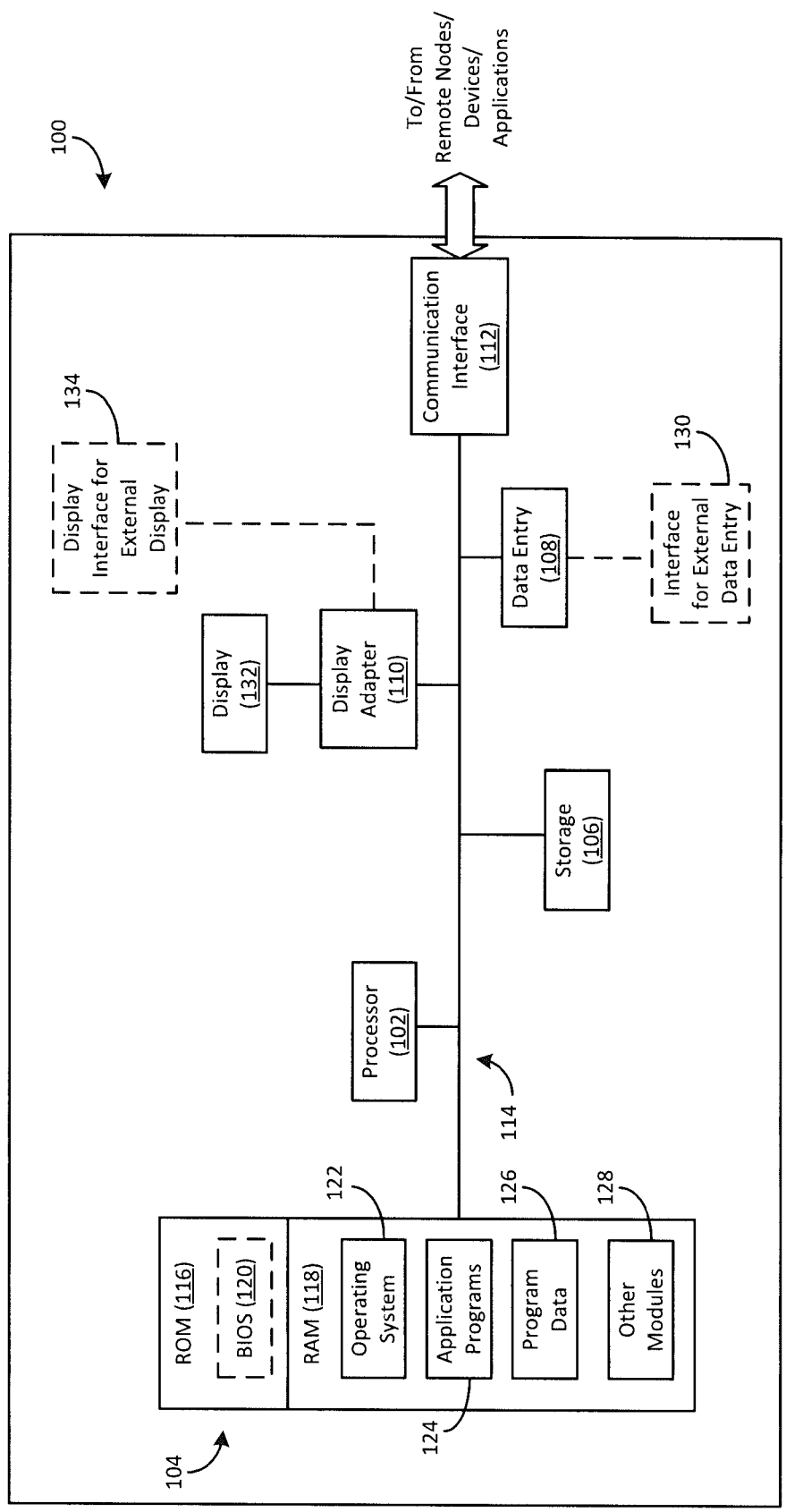
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
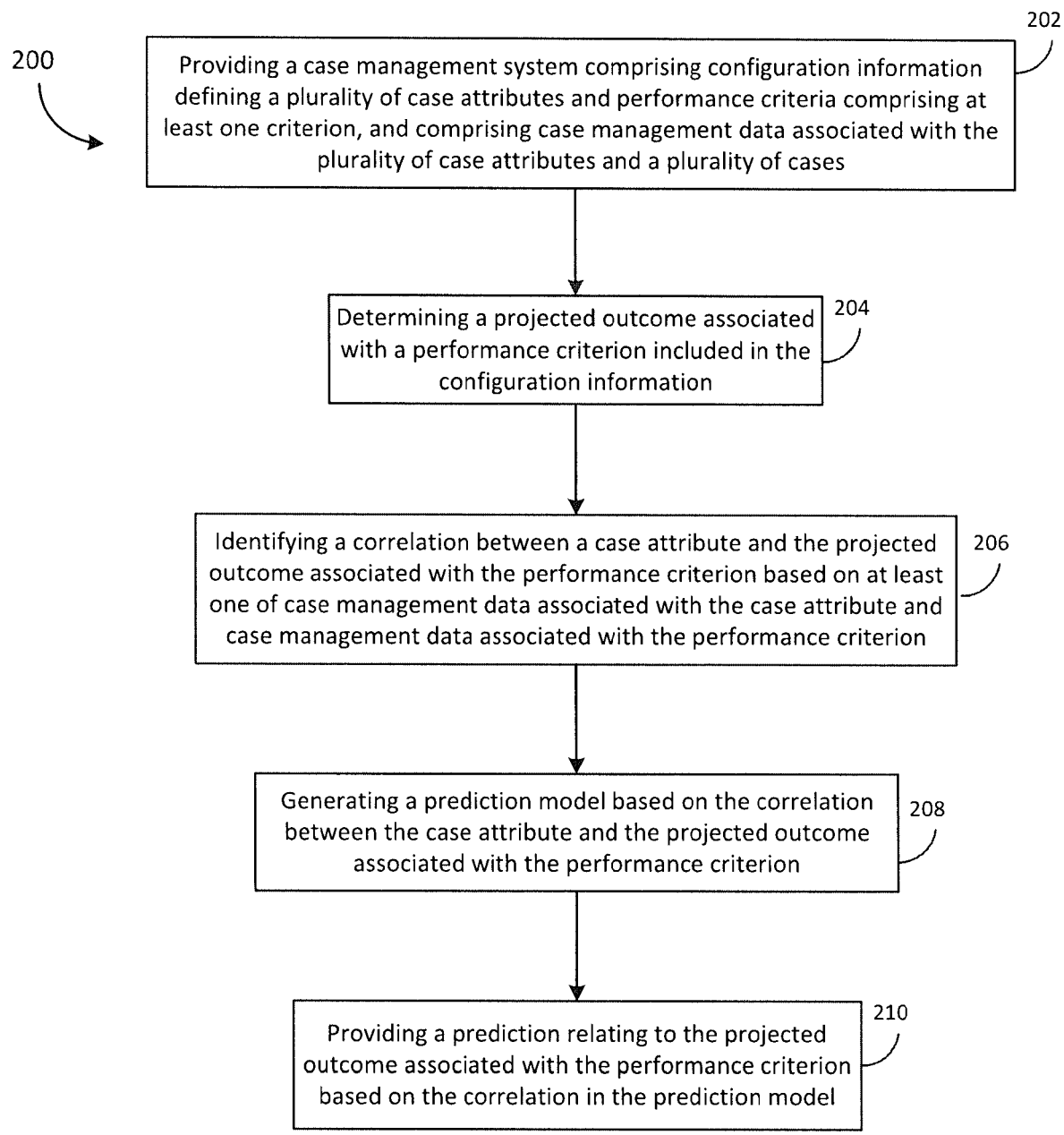
FIG. 2 is a flow diagram illustrating an exemplary method for providing automated predictive analysis for a case management system according to an exemplary embodiment.
Figure 3:
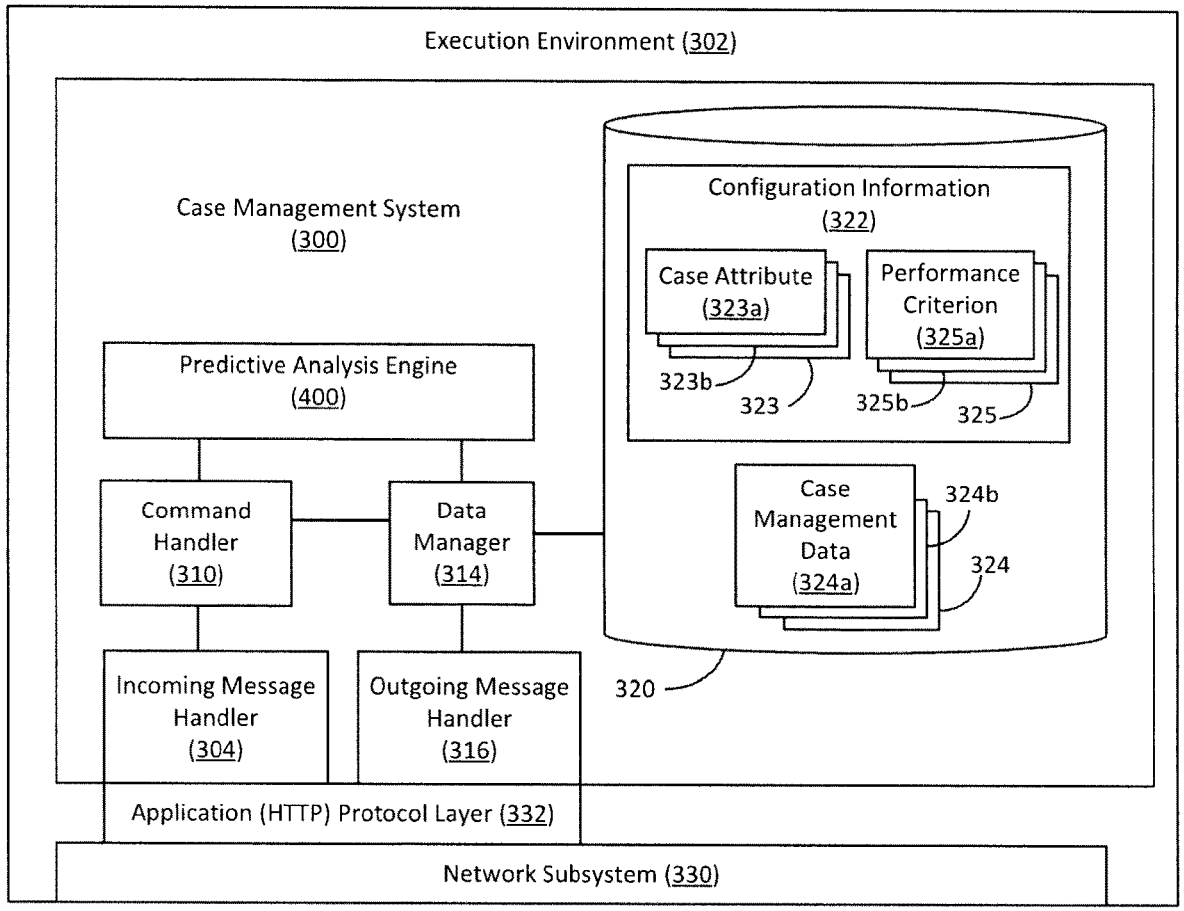
FIG. 3 is a block diagram illustrating an exemplary system for providing automated predictive analysis for a case management system according to an exemplary embodiment.

Referring now to FIG. 2, a flow diagram is presented illustrating a method 200 for automated predictive analysis for a case management system according to an exemplary embodiment. FIG. 3 is a block diagram illustrating an exemplary system for automated predictive analysis for a case management system according to embodiments of the subject matter described herein. The method 200 illustrated in FIG. 2 can be carried out by, for example, at least some of the components in the exemplary arrangement of components illustrated in FIG. 3. The arrangement of components in FIG. 3 may be implemented by some or all of the components of the hardware device 100 of FIG. 1.

Figure 5:
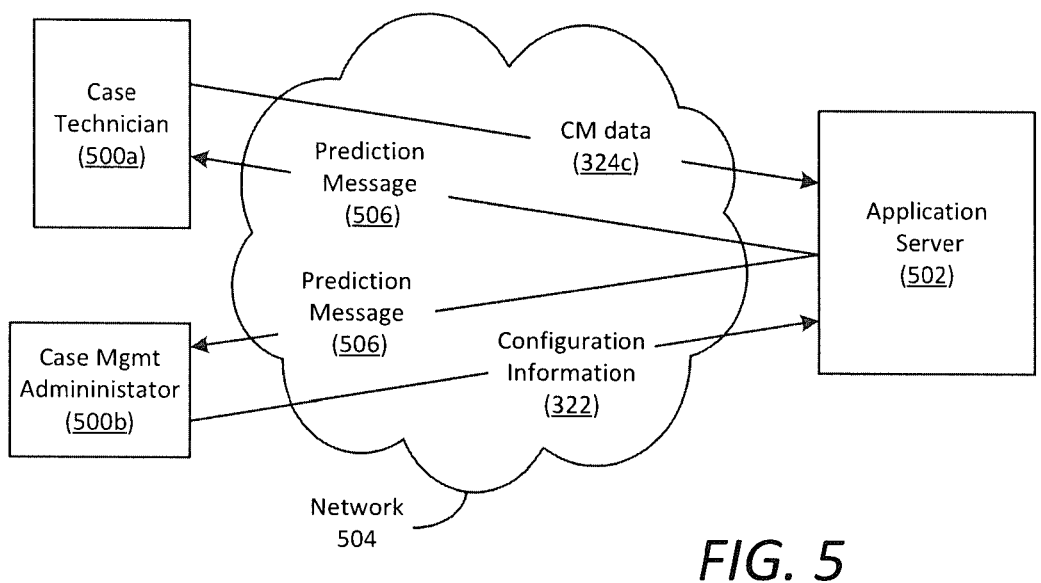
FIG. 5 is a block diagram illustrating a network in which a system for providing automated predictive analysis for a case management system can be implemented.

FIG. 3 illustrates components that are configured to operate within an execution environment hosted by a computer device and/or multiple computer devices, as in a distributed execution environment. For example, FIG. 5 illustrates a plurality of computer devices 500a, 500b, 502 communicatively coupled to one another via a network 504, such as the Internet, where an application server 502 can be configured to provide an execution environment configured to support the operation of the components illustrated in FIG. 3 and/or their analogs. Exemplary computer devices can include physical or virtual desktop computers, servers, networking devices, notebook computers, PDAs, mobile phones, digital image capture devices, and the like. For example, in an embodiment, the application server 502 can be a webserver.

With reference to FIG. 2, in block 202, a case management system is provided comprising configuration information defining a plurality of case attributes and performance criteria comprising at least one performance criterion. The case management system also includes case management data associated with the plurality of case attributes and with a plurality of cases. Illustrated in FIG. 3 is a case management system 300 including components adapted for operating in an execution environment 302. The execution environment 302, or an analog, can be provided by a computer device such as the application server 502. Exemplary network case management systems 300 can, in an embodiment, include business applications that collect and manage business processes, e.g., insurance claim processes, loan application processes, and the like. The case management system 300 includes a data store 320, such as a database, that is configured to store data. The data can be managed by a data manager 314, which can be configured to retrieve, add, update, and/or delete data.

Typically when the case management system 300 is initially provided, configuration information 322 can be received, e.g., from a case management administrator 500b, and stored in the data store 320. In an embodiment, the configuration information 322 can define case attributes 323 corresponding to types of information that are to be collected during a case management process. The case attributes 323 can include standard attributes, such as a process start date, and case specific attributes depending on a type of case being managed. For example, when the case management system 300 is used to manage bank loan applications, case attributes 323 can correspond to information needed to process bank loan applications, e.g., job title, annual salary, existing debt, and the like. On the other hand, when the case management system 300 is used to manage insurance claims, case attributes 323 can correspond to claim type, accident type, date of accident, time of accident, and the like.

In an embodiment, the configuration information 322 can also include performance criteria 325 comprising at least one performance criterion that defines business goals and requirements. Typically, performance criteria 325 are included in a service level agreement (SLA) and/or in key performance indicators (KPIs). Like case attributes 323, performance criteria 325 can be case specific depending on the type of case being managed. For example, a performance criterion 325a for a bank loan application process can identify a maximum number of days in which a loan application must be completed. Similarly, a performance criterion 325a for an insurance claim process can identify a time limit of a phone call for collecting information about a claimant.

Typically, the case management administrator 500b can define case attributes 323 that are related to the performance criteria 325 so that a business enterprise can determine whether the performance criteria 325 is met based on the related case attributes 323. For example, to determine whether a loan application has been completed within the time defined by the performance criterion 325a, a first case attribute 323a corresponding to a loan opening date and a second case attribute 323b corresponding to a loan closing date can be defined. Similarly, for the insurance claim process, a first case attribute 323a corresponding to a claimant interview start time and a second case attribute 323b corresponding to a claimant interview end time can be defined.

In an embodiment, once the configuration information 322 is received and stored, the case management system 300 can receive and store case management data 324. For example, a case processing technician 500a, in an embodiment, can receive and/or generate case management data 324 and provide it to the case management system 300 in the application server 502 via the network 504. For example, the case processing technician 500a can be a loan specialist responsible for processing loan applications, or an insurance claims adjustor responsible for processing insurance claims. The case processing technician 500a can provide the case management data 324 via a form template provided by the case management system 300 or by any other suitable format. In an embodiment, the case management data 324 is associated with the case attributes 323 and thus when a case attribute 323a is associated with a performance criterion 325a, the case management data 324a associated with the case attribute 323a can also be associated with the performance criterion 325a.

The case management system 300 can be configured to receive the case management data 324 over the network 504 via a network subsystem 330 and an application protocol layer, or other higher protocol layer, as illustrated by an exemplary HTTP protocol layer 332, among many possible standard and proprietary protocol layers. These higher protocol layers can encode, package, and/or reformat data for sending and receiving messages over a network layer, such as Internet Protocol (IP), and/or a transport layer, such as Transmission Control Protocol (TCP) and/or User Datagram Protocol (UDP). A command handler component 310 in the case management system 300 can be configured to receive the case management data 324 via an incoming message handler 304 and to route the data to the data manager 314. As stated above, the data manager 314 can be configured to store and manage the case management data 324 in the data store 320.

Referring again to FIG. 2 in block 204, a projected outcome associated with a performance criterion included in the configuration information is automatically determined. A system for providing automated predictive analysis for a case management system includes means for automatically determining a projected outcome associated with a performance criterion. For example, FIG. 3 illustrates a predictive analysis engine 400 that can be configured to automatically determine a projected outcome associated with a performance criterion 325a included in the configuration information 322. In an embodiment, the predictive analysis engine 400 can be included in the case management system 300, as shown in FIG. 3, and can have access to the data store 320 via the data manager 314. In another embodiment, the predictive analysis engine 400 can be provided outside of the case management system 300 as a separate component. In this case, the predictive analysis engine 400 can be configured to interact with more than one case management system 300 in a distributed environment.

Figure 4:
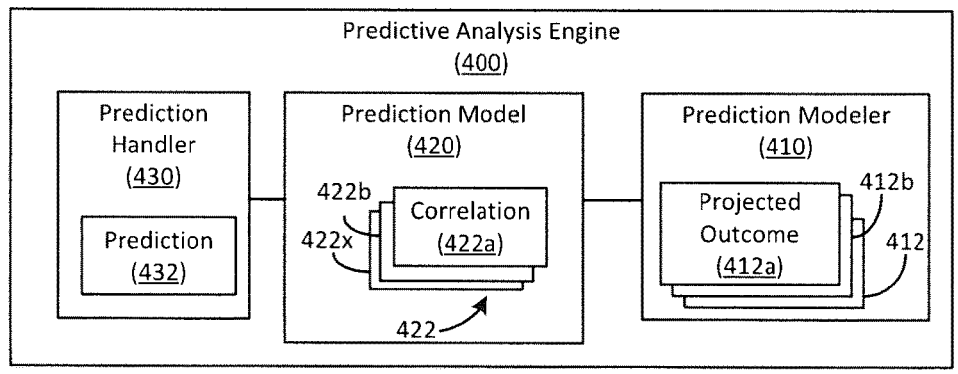
FIG. 4 is a block diagram illustrating another exemplary system for providing automated predictive analysis for a case management system according to an exemplary embodiment.

FIG. 4 is a block diagram illustrating an exemplary predictive analysis engine 400 according to an embodiment. A prediction modeler 410 in the predictive analysis engine 400 can be configured to retrieve from the data store 320 the performance criteria 325 which comprises at least one performance criterion 325a. In an embodiment, each performance criterion, e.g., 325a, can identify a service goal and/or a key performance indicator. For example, a performance criterion 325a can identify a service goal to review a loan application within three (3) business days.

According to an embodiment, the prediction modeler 410 can be configured to automatically determine the projected outcome by transforming the criterion 325a into a positive or negative statement. For example, the performance criterion 325a to review the loan application within three (3) days can be automatically converted into a projected outcome 412a by transforming the performance criterion 325a into the positive statement. For example, the projected outcome 412a associated with the performance criterion 325a can be, "The loan application will be reviewed within three (3) days." In an embodiment, projected outcomes 412 can be determined for each performance criterion 325a of the performance criteria 325. Once determined, the projected outcomes 412 associated with the performance criteria 325 can be stored in the prediction modeler 410.

Referring again to FIG. 2 in block 206, a correlation between a case attribute and the projected outcome associated with the performance criterion is automatically identified based on at least one of case management data associated with the case attribute and case management data associated with the performance criterion. A system for providing automated predictive analysis for a case management system includes means for automatically identifying such a correlation. For example, the prediction modeler 410 in the predictive analysis engine 400 can be configured to automatically identify a correlation between a case attribute, e.g., 323a, and the projected outcome, e.g., 412a, associated with the performance criterion 325a based on at least one of case management data associated with the case attribute and case management data associated with the performance criterion 325a.

According to an embodiment, a correlation defines a relationship between a case attribute and a projected outcome. For example, a correlation, e.g., 422a, can be identified between a case attribute 323a associated with an applicant's residence and a projected outcome 412a associated with a performance criterion 325a that requires the loan application be reviewed within three (3) business days. In an embodiment, the correlation 422a can be specific to when the case management data 324a associated with the case attribute 323a is "California," and can specifically indicate that the projected outcome 412a will not occur. In another example, a correlation 422b can be identified between a case attribute 323b associated with a loan application's education level and a projected outcome 412b associated with a time in which a loan process terminates. The correlation 422b can be specific to when the applicant is a college graduate, the projected outcome 412b will occur, i.e., the loan process terminates on time, but that when the applicant is not a college graduate, the projected outcome 412b will not occur, i.e., the loan process will not close on time.

According to an embodiment, the prediction modeler 410 can be configured to retrieve from the case management system 300 at least a portion of the case management data 324 associated with the case attributes 323 for a plurality of cases. In an embodiment, a minimum portion of the case management data 324 retrieved can correspond to case management data 324 for at least a predetermined number of cases, e.g., several thousand cases, in order to provide meaningful statistical analysis. Alternatively or in addition, the minimum portion of the case management data 324 retrieved can correspond to a percentage of the total number of cases, e.g., 60%, in another embodiment.

As noted above, the case management data 324 is usually collected by a case technician 500a during the processing of a case, e.g., loan application or insurance claim, and is typically associated with specific case attributes 323, some of which can be related to the performance criteria 325. Because a case attribute, e.g., 323a, can be associated with a performance criterion, e.g., 325a, the case management data 324a associated with the case attribute 323a can also be associated with the performance criterion 325a. For example, a case attribute, e.g., 323b, corresponding to a loan application close date can be associated with a performance criterion, e.g., 325b, corresponding to a maximum loan reviewing time. Accordingly, the case management data, e.g., 324*b*, associated with the case attribute 323*b*, e.g. a date on which the loan application closed, is also associated with the performance criterion 325*b*. Moreover, another case attribute, e.g., 323*a*, corresponding to a loan application opening date can be associated with the same performance criterion 325*b* because the opening and closing dates are relevant to the performance criterion 325*b*. Therefore, the case management data 324*a* associated with the other case attribute 323*a*, i.e., the opening date, is also associated with the same performance criterion 325*b*.

According to an embodiment, the prediction modeler 410 can be configured to analyze the retrieved case management data, e.g., 324*b*, associated with the case attribute 323*b* and case management data, e.g., 324*a*, associated with the performance criterion 325*a* to determine a correlation, e.g., 422*a* between the case attribute 323*b* and the projected outcome 412*a* associated with a performance criterion 325*a*. In an embodiment, the prediction modeler 410 can be configured to determine the correlation 422*a* by utilizing at least one predictive algorithm known in the art of statistical predictive analysis to analyze the case management data 324. For example, a decision tree predictive algorithm and/or a Naïve Bayes predictive algorithm can be utilized to detect a pattern between a case attribute 323*b* and a projected outcome 412*a*.

According to an embodiment, the prediction modeler 410 can be configured to determine the correlation 422*a* by first detecting a pattern between the case attribute 323*b* and the projected outcome 412*a*, and to determine whether the detected pattern is an anomaly or a valid correlation. In an embodiment, when the pattern is detected, the prediction modeler 410 can be configured to retrieve and analyze a second portion of the case management data from the data store 320 in the case management system 300. Based on this analysis, the prediction modeler 410 can be configured to determine that the pattern is valid when the same pattern is observed in the second portion of the case management data. When this is the case, the prediction modeler 410 can be configured to determine that the pattern is a valid correlation between the case attribute 323*b* and the projected outcome 412*a* associated with the performance criterion 325*a*.

In an embodiment, the prediction modeler 410 can be configured to determine more than one correlation, e.g., 422*a*, 422*b*, between the case attribute 323*b* and the projected outcome 412*a*. Alternatively, or in addition, the prediction modeler 410 can identify a correlation 422 between more than one case attribute 323*a*, 323*b* and the projected outcome 412*a*. For example, a correlation, e.g., 422*b*, can be identified between case attributes associated with a loan applicant's residence 323*a* and the loan applicant's education level 323*b*, and a projected outcome of the loan application terminating in a timely manner 412*b*. In other embodiments, more than one correlation can be identified for the projected outcome 412*a*, and/or a case attribute 323*a* can be correlated with more than one projected outcome 412*a*, 412*b* associated with more than one performance criterion 325*a*, 325*b*. According to an embodiment, the prediction modeler 410 can be configured to identify at least one correlation 422 for each projected outcome 412 determined for each performance criterion included in the performance criteria 325.

Referring again to FIG. 2, when the correlation 422 between the case attribute 323 and the projected outcome 412 is identified, a prediction model is generated, in block 208, based on the correlation 422 between the case attribute 323 and the projected outcome 412 associated with the performance criterion 325. A system for providing automated predictive analysis for a case management system includes means for automatically generating the prediction model. For example, the prediction modeler 410 in the predictive analysis engine 400 can be configured to automatically generate the prediction model 420 based on the correlation 422*a* between the case attribute 323*b* and the projected outcome 412*a* associated with the performance criterion 325*a*.

In an embodiment, the prediction model 420 comprises the correlations 422 identified by the prediction modeler 410. The prediction modeler 410 can be configured, in an embodiment, to generate different prediction models 420 utilizing different predictive algorithms. For example, the decision tree predictive algorithm can be used to generate a first prediction model and the Naïve Bayes prediction algorithm can be used to generate a second prediction model. In an embodiment, the prediction modeler 410 can then test each prediction model against a subset of the case management data 324 and can select the prediction model that best represents the case management data 324 to be the engine's prediction model 420.

Referring again to FIG. 2, when the prediction model 420 is generated, a prediction relating to the projected outcome 412*a* associated with the performance criterion 325*a* is provided based on the correlation 422*a* in the prediction model 420 in block 210. A system for providing automated predictive analysis for a case management system includes means for automatically providing the prediction. For example, a prediction handler 430 in the predictive analysis engine 400 can be configured to automatically provide a prediction 432 relating to the projected outcome 412*a* associated with the performance criterion 325*a* based on the correlation 422*a* in the prediction model 420.

According to an embodiment, the prediction handler 430 can be configured to access the prediction model 420 and to generate a prediction 432 based on the correlations 422 in the prediction model 420. In an embodiment, the prediction 432 can be generated and provided when incoming case management data 324*c* associated with a case attribute 323 is received by the case management system 300. In an embodiment, the incoming case management data 324*c* associated with a case attribute, e.g., 323*a*, can be received by an incoming data handler 304 operating in the case management system 300 in the execution environment 302 provided by the application server 502.

In an embodiment, a case technician 500*a* processing a case can collect information corresponding to various case attributes 323 from a customer or applicant, and then submit the information as incoming case management data 324*c*. The incoming case management data 324*c* can include an indicator identifying the case attribute, e.g., 323*a*, with which it is associated, and can be sent to the case management system 300 via the network 504. The incoming case management data 324*c* can be received by the incoming data handler 304 via the network subsystem 330 and optionally the higher protocol layer 332. When the data 324*c* is received, the incoming data handler 304 can be configured to route the data 324*c* to the prediction handler 430 in the predictive analysis engine 400 via the command handler 310.

According to an embodiment, when the prediction handler 430 receives the incoming case management data 324*c*, it can be configured to determine, based on the indicator, the case attribute, e.g., 323*a*, associated with the data 324*c*. Using this information, the prediction handler 430 can, in an embodiment, access the prediction model 420 to identify a correlation, e.g., 422*a*, between the case attribute 323*a* associated with the incoming case management data 324c and a projected outcome, e.g., 412a, associated with the performance criterion, e.g., 325a.

In an embodiment, when a correlation 422a is identified, the prediction handler 430 can be configured to apply the correlation 422a to the incoming case management data 324c and to generate automatically the prediction 432 relating to the projected outcome 412a based on the correlation 422a. For example, the case attribute 323a can be associated with a loan applicant's residence and the identified correlation 422a can indicate that when the case management data 324a associated with the case attribute 323a is "California," the projected outcome 412a will not occur, e.g., the loan application will not be reviewed within three (3) business days. The prediction handler 430 can apply the correlation 422a to the incoming case management data 324c, i.e., determine whether the incoming case management data 324c is "California." When the incoming case management data 324c is "California," the prediction handler 430 can automatically generate a prediction 432 indicating that the projected outcome 412a will not occur. For example, the prediction 432 can be, "The loan application will not be reviewed within three (3) business days." Alternatively, when the incoming case management data 324c is not "California," the prediction handler 430 can provide no prediction, or can automatically generate a prediction 432 indicating that the projected outcome 412a will occur.

In an embodiment, the prediction 432 can be transmitted, automatically or upon request, to the case technician 500a and/or the case management administrator 500b over the network 504. For example, the prediction handler 430 can be configured to provide the prediction 432 to an outgoing data handler 316 in the case management system 300 via the data manager 314. In an embodiment, the outgoing data handler 316 can be configured to build a prediction message 506 including the prediction 432 and to interoperate directly with the protocol layer of the network subsystem 330 or with an application protocol layer, as described above and illustrated by the exemplary HTTP protocol layer 332. The prediction message 506 including the prediction 432 can be transmitted as a whole or in parts via the network subsystem 330 over the network 504 to the case technician 500a and/or the case management administrator 500b.

According to an embodiment, the prediction 432 can also be stored in the data store 320 and later can be used to validate the correlation 422a and/or the prediction model 420. For example, after the prediction 432 is generated, the prediction handler 430 can be configured to invoke the data manager 314 to store the prediction 432 in the data store 320. Later, the prediction handler 430 can receive incoming case management data 324c associated with the performance criterion 325a upon which the prediction 432 is based, and can be configured to determine an actual outcome associated with the performance criterion 325a. In an embodiment, the prediction 432 can be retrieved from the data store 320 and the prediction handler 430 can be configured to compare the prediction 432 to the actual outcome. Based on this comparison, the correlation 422a can be validated when the prediction 432 matches the actual outcome.

For instance, continuing with the previous example where the prediction 432 is, "The loan application will not be reviewed within three (3) business days," incoming case management data 324c associated with a date indicating when the loan application is reviewed can be received, and the prediction handler 430 can determine an actual outcome that the loan application was reviewed five (5) days after it was submitted. When the prediction 432 and the actual outcome are compared, the prediction 432 matches the actual outcome and therefore, the correlation 422a is validated.

According to another embodiment, when incoming case management data 324c associated with a performance criterion 325a is received, the prediction handler 430 can be configured to identify a correlation 422a associated with the performance criterion 325a and from the correlation 422a, to identify a case attribute 323a correlated to the projected outcome 412a associated with the performance criteria 325a. In an embodiment, the prediction handler 430 can be configured to determine that the correlation 422a between the case attribute 323a and the projected outcome 412a is valid based on the incoming case management data 324c.

For example, incoming case management data 324c comprising a loan process termination date is associated with a performance criterion 325a defining a time in which a loan process terminates. When this data is received, the prediction handler 430 can identify an associated correlation 422a between a case attribute 323a associated with a loan application's education level and a projected outcome 412a associated with the performance criterion 325a defining the time in which a loan process terminates. Specifically, the correlation 422a can indicate that when the applicant is a college graduate, the projected outcome will occur, i.e., the loan process terminates on time. The prediction handler 430 can determine that the loan process terminated in a timely manner based on the incoming case management data 324c and can also determine that the applicant is a college graduate based on the case management data 324a associated with the case attribute 323a. In this manner, the correlation 422a can be validated based on the incoming case management data 324c associated with the performance criterion 325a.

In another embodiment, when incoming case management data 324c associated with a performance criterion 325a is received, the prediction handler 430 can be configured to determine that the associated correlation 422a between the case attribute 323a and the projected outcome 412a is not valid based on the incoming case management data 324c, but that a new correlation exists. In an embodiment, the prediction handler 430 can be configured to identify the new correlation 422x and to update the prediction model 420 to include the new correlation 422x.

According to embodiments, an automated predictive analysis engine is integrated with a case management system so that, in addition to managing case management data and generating reports, the case management system also can automatically predict future conditions based on certain and predetermined performance criteria. In an embodiment, a prediction model used by the predictive analysis engine is generated from configuration information provided by the enterprise, e.g., the SLAs/KPIs, and from data received by the case management system during operation. Based on the SLA/KPI, the engine automatically selects features or attributes that are relevant for analysis and builds the prediction model. Once built, the prediction model can be validated against existing stored case management data, and when validated, can then be implemented to provide continuous predictive analysis of incoming case management data. As new case management data is received, the predictive analysis engine can automatically predict future conditions. The predictive analysis engine can also continuously validate the prediction model against real time data so that it implements a self-learning feature, and the predictions are based on dynamic information.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A system comprising:
    a case management server coupled by an application protocol layer to a network subsystem, the case management server defining case management data associated with a plurality of cases, the defined case management data including user-configured case attributes and user-configured performance criteria, the performance criteria defining predetermined goals for associated ones of the case attributes;
    a plurality of remote computer devices communicatively coupled to the case management server by the network subsystem; and
    a data store coupled to the case management server, wherein the data store contains configuration data including the defined case management data, wherein the case attributes are compared to the performance criteria to determine whether the performance criteria have been met;
    the case management server including a self-learning predictive analysis engine configured to:
        retrieve from a predetermined minimum number of the plurality of cases or a predetermined minimum percentage of the plurality of cases, a first portion of the configuration data containing a plurality of the case attributes and a corresponding plurality of the performance criteria and associated outcomes,
        analyze the retrieved configuration data and generate a set of projected outcomes corresponding to the performance criteria,
        generate, correlation data, wherein the correlation data establishes for each of the case attributes a relationship with a corresponding one of the projected outcomes based on at least one of the performance criteria corresponding to respective ones of the case attributes and the projected outcomes, and
        store the correlation data in the data store;
    the self-learning predictive analysis engine further configured to thereafter:
        receive case data from a first remote computer device of the plurality of remote computer devices, the case data including one or more attributes for a corresponding specific case,
        in response to receiving the case data, identify values of the one or more attributes in the received case data,
        retrieve the generated correlation data,
        generate, from the retrieved correlation data, a first prediction model using a decision tree predictive algorithm,
        generate, from the retrieved correlation data, a second prediction model using a Naive Bayes prediction algorithm,
        test the first and second prediction models with an actual outcome to select one prediction model that best represents the defined case management data by detecting a same pattern between one of the case attributes and one of the projected outcomes, in two distinct portions of the defined case management data,
        identify, using the selected prediction model, for the corresponding specific case, ones of the projected outcomes in the stored correlation data that are associated with the identified case attribute values in the received case data;
    the case management server including an outgoing data handler, interoperating directly with an http protocol layer, and configured to:
        build a message based on the identified projected outcomes for the corresponding specific case that are associated by the correlation data with the identified case attribute values, and
        provide the message to the application protocol layer;
    the application protocol layer configured to format the received message for delivery to the first remote computer device.

2. The system of claim 1, wherein the self-learning predictive analysis engine is configured to:
    generate the correlation data based on a first portion of the configuration data;
    retrieve a second portion of the configuration data which is different from the first portion of the configuration data; and
    for each of one or more cases in the second portion of the configuration data: identify attributes in the case data, identify in the stored correlation data specific projected outcomes associated with the identified case attributes, compare the identified specific projected outcomes with respective outcomes identified for the plurality of cases in the configuration data, and verify the specific projected outcomes with the respectively identified outcomes for the plurality of cases in the configuration data.

3. The system of claim 1, further comprising an incoming message handler configured to interface with the application protocol layer and to receive the case data from the first remote computer device.

4. The system of claim 3, further comprising a command handler coupled to the incoming message handler and configured to route the configuration data and the case data received via the incoming message handler.

5. The system of claim 4, wherein when the command handler receives incoming configuration data, the command handler is configured to route the incoming configuration data to a data manager of the case management server, wherein the data manager is configured to store the received configuration data in the data store.

6. The system of claim 4, wherein when the command handler receives incoming case data from the first remote computer device, the command handler is configured to route the incoming case data to the self-learning predictive analysis engine.

7. The system of claim 1, wherein the self-learning predictive analysis engine is further configured to validate the generated correlation data against the received case data, update the generated correlation data according to the received case data, and store the updated correlation data.

8. A computer program product, comprising a non-transitory computer readable storage medium that stores thereon computer-readable program code that is executable by a processor to:
execute a case management system configured to receive a message via an application protocol layer coupled to a network subsystem, the application protocol layer configured to format the received message for delivery to a first remote computer device of a plurality of remote computer devices, the case management system including a self-learning predictive analysis engine and an outgoing data handler interoperating directly with an http protocol layer, the case management system defining case management data associated with a plurality of cases, the defined case management data including user-configured case attributes and user-configured performance criteria, the performance criteria defining predetermined goals for associated ones of the case attributes;
store, by the case management system, configuration data including the defined case management data in a data store, wherein the case attributes are compared to the performance criteria to determine whether the performance criteria have been met;
retrieve, by the self-learning predictive analysis engine from a predetermined minimum number of the plurality of cases or a predetermined minimum percentage of the plurality of cases, a first portion of the configuration data containing a plurality of the case attributes and a corresponding plurality of the performance criteria and associated outcomes;
analyze, by the self-learning predictive analysis engine, the retrieved configuration data and generate a set of projected outcomes corresponding to the performance criteria;
generate, by the self-learning predictive analysis engine, correlation data which establishes for each of the case attributes a relationship with a corresponding one of the projected outcomes based on at least one of the performance criteria corresponding to respective ones of the case attributes and the projected outcomes;
store, by the self-learning predictive analysis engine, the correlation data;
receive, by the self-learning predictive analysis engine, case data from the first remote computer device via the network subsystem, the case data including one or more attributes for a corresponding specific case;
in response to receiving the case data, identify, by the self-learning predictive analysis engine, values of the one or more attributes in the received case data;
retrieve, by the self-learning predictive analysis engine, the generated correlation data;
generate, from the retrieved correlation data, a first prediction model using a decision tree predictive algorithm;
generate, from the retrieved correlation data, a second prediction model using a Naive Bayes prediction algorithm;
test the first and second prediction models with an actual outcome to select one prediction model that best represents the defined case management data by detecting a same pattern between one of the case attributes and one of the projected outcomes, in two distinct portions of the defined case management data;
identify, by the self-learning predictive analysis engine using the selected prediction model, for the corresponding specific case, ones of the projected outcomes in the stored correlation data that are associated with the identified case attributes values in the received case data;
build, by the outgoing data handler, the message based on the identified projected outcomes for the corresponding specific case that are associated by the correlation data with the identified case attribute values; and
provide, by the outgoing data handler, the message to the application protocol layer;
format the received message for delivery to the first remote computer device.

9. The computer program product of claim 8, wherein the program code is further executable by the processor to:
generate, by the case management system, the correlation data based on a first portion of the configuration data;
retrieve, by the case management system, a second portion of the configuration data which is different from the first portion of the configuration data; and
for each of one or more cases in the second portion of the configuration data: identify, by the case management system, attributes in the case data, identify in the stored correlation data specific projected outcomes associated with the identified case attributes, compare the identified specific projected outcomes with respective outcomes identified for the plurality of cases in the configuration data, and verify the specific projected outcomes with the respectively identified outcomes for the plurality of cases in the configuration data.

10. The computer program product of claim 8, wherein the program code is further executable by the processor to implement an incoming message handler which interfaces with the application protocol layer and receives the case data from the first remote computer device.

11. The computer program product of claim 10, wherein the program code is further executable by the processor to implement a command handler which is coupled to the incoming message handler and configured to route the configuration data and the case data received via the incoming message handler.

12. The computer program product of claim 11, wherein the program code is further executable by the processor to, when the command handler receives incoming configuration data, route the incoming configuration data to a data manager that stores the received configuration data in the data store.

13. The computer program product of claim 11, wherein the program code is further executable by the processor to, when the command handler receives incoming case data from the first remote computer device, route the incoming case data to the self-learning predictive analysis engine.

14. The computer program product of claim 8, wherein the program code is further executable by the processor to validate, by the self-learning predictive analysis engine, the generated correlation data against the received case data, update the generated correlation data according to the received case data, and store the updated correlation data.

15. A method executed in a case management system having a self-learning predictive analysis engine and an outgoing data handler, the method comprising:
executing the case management system to receive a message via an application protocol layer coupled to a network subsystem, the application protocol layer configured to format the received message for delivery to a first remote computer device of a plurality of remote computer devices, the case management system including the self-learning predictive analysis engine and the outgoing data handler interoperating directly with an http protocol layer, the case management system defining case management data associated with a plurality of cases, the defined case management data including user-configured case attributes and user-configured performance criteria, the performance criteria defining predetermined goals for associated ones of the case attributes;
storing, by the case management system, configuration data including the defined case management data in a data store, wherein the case attributes are compared to the performance criteria to determine whether the performance criteria have been met;
retrieving, by the self-learning predictive analysis engine from a predetermined minimum number of the plurality of cases or a predetermined minimum percentage of the plurality of cases, a first portion of the configuration data containing a plurality of the case attributes and a corresponding plurality of the performance criteria and associated outcomes;
analyzing, by the self-learning predictive analysis engine, the retrieved configuration data and generate a set of projected outcomes corresponding to the performance criteria;
generating, by the self-learning predictive analysis engine, correlation data which establishes for each of the case attributes a relationship with a corresponding one of the projected outcomes based on at least one of the performance criteria corresponding to respective ones of the case attributes and the projected outcomes;
storing, by the self-learning predictive analysis engine, the correlation data;
receiving, by the self-learning predictive analysis engine, case data from the first remote computer device via the network subsystem, the case data including the one or more attributes for a corresponding specific case;
in response to receiving the case data, identifying, by the self-learning predictive analysis engine, one or more attributes in the received case data;
retrieving, by the self-learning predictive analysis engine, the generated correlation data;
generating, from the retrieved correlation data, a first prediction model using a decision tree predictive algorithm;
generating, from the retrieved correlation data, a second prediction model using a Naive Bayes prediction algorithm;
testing the first and second prediction models with an actual outcome to select one prediction model that best represents the defined case management data by detecting a same pattern between one of the case attributes and one of the projected outcomes, in two distinct portions of the defined case management data;
identifying, by the self-learning predictive analysis engine using the selected prediction model, for the corresponding specific case, ones of the projected outcomes in the stored correlation data that are associated with the identified case attributes values in the received case data;
building, by the outgoing data handler, the message based on the identified projected outcomes for the corresponding specific case that are associated by the correlation data with the identified case attribute values; and
providing, by the outgoing data handler, the message to the application protocol layer;
formatting the received message for delivery to the first remote computer device.

16. The method of claim 15, further comprising:
generating, by the case management system, the correlation data based on a first portion of the configuration data;
retrieving, by the case management system, a second portion of the configuration data which is different from the first portion of the configuration data; and
for each of one or more cases in the second portion of the configuration data: identifying, by the case management system, attributes in the case data, identifying in the stored correlation data specific projected outcomes associated with the identified case attributes, comparing the identified specific projected outcomes with respective outcomes identified for the plurality of cases in the configuration data, and verifying the specific projected outcomes with the respectively identified outcomes for the plurality of cases in the configuration data.

17. The method of claim 15, further comprising implementing an incoming message handler which interfaces with the application protocol layer and receives the case data from the first remote computer device.

18. The method of claim 17, further comprising implementing a command handler which is coupled to the incoming message handler and configured to route the configuration data and the case data received via the incoming message handler.

19. The method of claim 18, further comprising:
routing, when the command handler receives incoming configuration data, the incoming configuration data to a data manager that stores the received configuration data in the data store; and
routing, when the command handler receives incoming case data from the first remote computer device, the incoming case data to the self-learning predictive analysis engine.

20. The method of claim 15, validating, by the self-learning predictive analysis engine, the generated correlation data against the received case data, updating the generated correlation data according to the received case data, and storing the updated correlation data.

\* \* \* \* \*